United States Patent
Ernst et al.

(10) Patent No.: US 11,739,665 B2
(45) Date of Patent: Aug. 29, 2023

(54) WASTE HEAT RECOVERY SYSTEM AND CONTROL

(71) Applicant: CUMMINS INC., Columbus, IN (US)

(72) Inventors: Timothy C. Ernst, Columbus, IN (US); James A. Zigan, Versailles, IN (US); Jared Carpenter Delahanty, Morgantown, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/612,646

(22) PCT Filed: May 14, 2020

(86) PCT No.: PCT/US2020/032777
§ 371 (c)(1),
(2) Date: Nov. 19, 2021

(87) PCT Pub. No.: WO2020/242768
PCT Pub. Date: Dec. 3, 2020

(65) Prior Publication Data
US 2022/0228513 A1 Jul. 21, 2022

Related U.S. Application Data

(60) Provisional application No. 62/855,234, filed on May 31, 2019.

(51) Int. Cl.
*F01K 23/06* (2006.01)
*F02G 5/02* (2006.01)
*F01K 23/10* (2006.01)

(52) U.S. Cl.
CPC .............. *F01K 23/065* (2013.01); *F02G 5/02* (2013.01); *F01K 23/10* (2013.01); *F02G 2260/00* (2013.01)

(58) Field of Classification Search
CPC .......... F01D 25/12; F01D 25/24; F01D 25/26; F01D 25/28; F02B 37/013; F02B 39/00;
(Continued)

(56) References Cited

U.S. PATENT DOCUMENTS 5,070,706 A * 12/1991 Waters ................ G01L 19/0092
374/E13.006
7,681,396 B2 * 3/2010 Hartmann ................ F01K 7/18
60/653

(Continued)

OTHER PUBLICATIONS

International Search Report and Written Opinion for PCT Application No. PCT/US2020/032777, dated Aug. 12, 2020.

*Primary Examiner* — Jesse S Bogue
(74) *Attorney, Agent, or Firm* — Foley & Lardner LLP (57) ABSTRACT

A waste heat recovery (WHR) system that can be utilized in internal combustion engine systems includes at least two circuits, one having a low pressure working fluid and another having a high pressure working fluid. Each circuit can include heat exchangers to allow the working fluid to absorb heat form one or more heat source fluids associated with the engine. The system can also include an expander configured to receive the working fluid from the at least two circuits, and generating mechanical power. The system also can include a condenser, a sub cooler, and at least one working fluid pump to pump the working fluid in the at least two circuits. The cooling system also includes a controller that can receive temperature and pressure values from various locations in the WHR system and control at least the flow rates of the working fluids in the at least two circuits.

20 Claims, 7 Drawing Sheets

(58) Field of Classification Search
CPC .... F02B 39/005; F05D 2220/40; Y02T 10/12; F02G 2260/00; F02G 5/02; F01K 23/06; F01K 23/065; F01K 23/10
See application file for complete search history.

(56) References Cited

U.S. PATENT DOCUMENTS

| | | | |
|---|---|---|---|
| 8,046,999 B2 | 11/2011 | Doty | |
| 9,046,006 B2 | 6/2015 | Ritter | |
| 9,243,518 B2* | 1/2016 | Cook | F01K 25/10 |
| 9,657,603 B2* | 5/2017 | Grelet | F01K 23/065 |
| 9,932,862 B2* | 4/2018 | Gibble | F01K 23/06 |
| 10,436,075 B2* | 10/2019 | Freund | F01K 25/08 |
| 2008/0289335 A1* | 11/2008 | Drysdale | H02M 7/10 60/649 |
| 2010/0263380 A1 | 10/2010 | Biederman et al. | |
| 2011/0072818 A1 | 3/2011 | Cook | |
| 2011/0265501 A1 | 11/2011 | Nir | |
| 2015/0267638 A1 | 9/2015 | Morris et al. | |
| 2016/0130981 A1 | 5/2016 | Grelet | |
| 2017/0175586 A1 | 6/2017 | Tricaud et al. | |
| 2019/0249589 A1* | 8/2019 | Ernst | F02G 5/02 |

\* cited by examiner

WASTE HEAT RECOVERY SYSTEM AND CONTROL

CROSS-REFERENCE TO RELATED PATENT APPLICATIONS

This application is the U.S. national phase of PCT Application No. PCT/US2020/032777, filed May 14, 2020, which claims priority to U.S. Provisional Application No. 62/855,234, filed May 31, 2019, entitled "Waste Heat Recovery System and Control," the contents of which are incorporated herein in their entirety.

GOVERNMENT SUPPORT CLAUSE

This invention was made with Government support under DE-EE0007761 awarded by the Department of Energy (DOE). The Government has certain rights in this invention.

TECHNICAL FIELD

The present disclosure relates to waste heat recovery (WHR) systems, and in particular to WHR systems used with vehicles.

BACKGROUND

A WHR system recovers heat energy from a vehicle component or system, such as from an internal combustion engine of the vehicle that would otherwise be lost. The more waste heat energy that is extracted from the component or system by a WHR system, the greater the potential efficiency of the engine. In other words, rather than the extracted heat being lost, the extracted heat energy may be repurposed to, e.g., supplement the power output from the internal combustion engine, thereby increasing the efficiency of the system. Some WHR systems use a Rankine cycle (RC), which is a thermodynamic process in which heat is transferred to a working fluid of the RC circuit. The working fluid is pumped through a heat exchanger where the working fluid is vaporized. The vapor is passed through an expander and then through a condenser, where the vapor is condensed back into liquid. The expander may drive a generator to generate electrical energy. An organic RC (ORC) is an RC in which the working fluid is an organic, high molecular mass fluid with a liquid-vapor phase change at a lower temperature than that of water. Such a fluid allows for heat recovery from lower temperature sources relative to other non-organic RC circuits.

SUMMARY

In one aspect, a WHR system includes at least two pressure circuits, each pressure circuit including at least one heat exchanger, each of the at least two pressure circuits providing a working fluid to the respective at least one heat exchanger and to an expander having a plurality of inputs corresponding to a number of the at least two circuits, and a controller communicably coupled with the at least two pressure circuits. The controller is configured to receive a first pressure value and a first temperature value from a first sensor positioned at one of an inputs of the expander. The controller is further configured to determine a superheated temperature value from the first pressure value based on at least one characteristic of the working fluid. The controller is also configured to determine whether the first temperature value is greater than the superheated temperature value. The controller is further configured to control, responsive to determining that the first temperature value is greater than the superheated temperature value, at least one of a pump pumping the working fluid or a bypass valve positioned across the pump to increase a flow of the working fluid.

In another aspect, a method is provided for operating WHR system that includes at least two pressure circuits, each pressure circuit including at least one heat exchanger, the at least two circuits providing a working fluid to the respective at least one heat exchanger and to an expander having a plurality of inputs corresponding to a number of the at least two circuits. The method includes receiving, at a controller, a first pressure value and a first temperature value from a first sensor positioned at one of an inputs of the expander. The method further includes determining, at the controller, a superheated temperature value from the first pressure value based on at least one characteristic of the working fluid. The method also includes determining, at the controller, whether the first temperature value is greater than the superheated temperature value. The method further includes controlling, by the controller responsive to determining that the first temperature value is greater than the superheated temperature value, at least one of a pump pumping the working fluid or a bypass valve positioned across the pump to increase a flow of the working fluid.

In one or more implementations, the method further includes receiving, at the controller, a second temperature value and a second pressure value from a second sensor positioned at an output of a subcooler receiving working fluids from the at least two circuits. The method also includes determining, at the controller, a subcooled temperature value based on the second pressure value and at least one characteristic of the working fluid. The method further includes determining, at the controller, whether the second temperature value is less than the subcooled temperature value. The method also includes controlling, by the controller, responsive to determining that the second temperature value is less than the subcooled temperature value, at least one valve increasing flow of the working fluid to or from a working fluid reservoir to the subcooler.

In one or more implementations, the method also includes receiving, at the controller, a third temperature value from a third sensor positioned at an output of at least one heat exchanger. The method further includes determining, at the controller, whether the third temperature value is less than a target temperature value. The method also includes controlling, by the controller responsive to determining that the third temperature value is less than the target temperature value, a bypass valve across the at least one heat exchanger to allow at least a portion of the working fluid to flow from upstream of the at least one heat exchanger to downstream of the at least one heat exchanger.

In one or more implementations, the method further includes receiving, at the controller, a third pressure value form a fourth sensor positioned at least one input of the plurality of inputs of the expander. The method also includes determining, at the controller, that the third pressure value is greater than a target pressure value. The method further includes controlling, by the controller responsive to determining that the third pressure value is greater than the target pressure value, a bypass valve across the expander to allow at least a portion of the working fluid from upstream of the at least one input of the plurality of inputs of the expander to downstream of an output of the expander.

In one or more implementations, the WHR system includes a transfer valve positioned between a first pressure circuit and a second pressure circuit of the at least two pressure circuits, the first pressure circuit having a working fluid pressure that is less than a working fluid pressure of the second pressure circuit. The method further includes receiving, at the controller, a fourth temperature value from a fourth temperature sensor positioned at an output of a heat exchanger in the first pressure circuit. The method also includes determining, at the controller, that the fourth temperature value is above a first circuit temperature target value. The method additionally includes controlling, by the controller, the transfer valve to transfer working fluid from the second pressure circuit to the first pressure circuit.

In one or more implementations, the WHR system includes a common pump providing working fluid to both a first pressure circuit and a second pressure circuit of the at least two pressure circuits, the first pressure circuit having a working fluid pressure that is less than a working fluid pressure of the second pressure circuit, and a transfer valve diverting a portion of the working fluid from the second pressure circuit to the first pressure circuit. The method further includes receiving, at the controller, a fourth temperature value from a fourth temperature sensor positioned at an output of a heat exchanger in the first pressure circuit. The method also includes determining, at the controller, that the fourth temperature value is above a first circuit temperature target value. The method additionally includes controlling, by the controller, the transfer valve to increase transfer of working fluid from the second pressure circuit to the first pressure circuit.

In yet another aspect, a system includes an engine, and a WHR system. The WHR system includes at least two pressure circuits, each pressure circuit including at least one heat exchanger receiving at least one fluid associated with the engine, the at least two pressure circuits providing a working fluid to the respective at least one heat exchanger and to an expander having a plurality of inputs corresponding to a number of the at least two circuits, and a controller communicably coupled with the at least two pressure circuits. The controller is configured to receive a first pressure value and a first temperature value from a first sensor positioned at one of an inputs of the expander. The controller is further configured to determine a superheated temperature value from the first pressure value based on at least one characteristic of the working fluid. The controller is also configured to determine whether the first temperature value is greater than the superheated temperature value. The controller is further configured to control, responsive to determining that the first temperature value is greater than the superheated temperature value, at least one of a pump pumping the working fluid or a bypass valve positioned across the pump to increase a flow of the working fluid.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive WHR systems and methods of operating WHR systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

WHR systems can recover thermal or other forms of energy in a vehicle that would otherwise be dissipated and lost to the environment, and help convert the energy into usable electrical or mechanical energy. In particular, the WHR systems can absorb heat generated by various components of a vehicle, such as, for example, the engine or the exhaust. The WHR system can use the absorbed heat to impart motion to a heated working fluid, which, in turn, can drive or rotate a driving shaft. The driving shaft can be coupled to a final drive (such as, for example, wheels) or can be coupled to a drive shaft of a motor/generator that can convert the imparted torque into electrical energy. In hybrid vehicles, the WHR system can provide the electrical energy for charging a battery, which, in turn, can provide power to one or more electrical motors that drive the vehicle.

Some WHR systems can include more than one working fluid circuit. For example, a WHR system can include a high pressure circuit and a low pressure circuit, where the working fluid in the high pressure circuit is operated at a pressure higher than that of the working fluid in the low pressure circuit. Each circuit may absorb heat from more than one heat sources. For example, the heat sources can include the engine coolant, the engine charge air, the engine exhaust, the engine exhaust gas recirculation (EGR) system, etc. These heat sources provide various degrees of heat energy to the working fluid at various portions of the respective high and low pressure circuits. Moreover, the heat energy provided by these heat sources can vary over time. It is desired for the working fluid in each circuit to be operated within particular ranges of temperature and pressure that result in a more effective heat recovery. With multiple circuits and multiple heat sources the operating temperature or pressure of the working fluid may deviate from the desired ranges of temperature and pressure. This can result in inefficient heat recovery and conversion. This can also result in inefficient operation of the engine, in particular, where the temperature of certain fluids, such as the exhaust in the EGR, is desired to be maintained within strict range of values.

The WHR systems discussed herein provide a solution to the problem of maintaining the WHR circuit within the desired operating conditions. In particular, the WHR systems provide a control circuit that senses the temperature and pressure of the working fluid at various portions of the high pressure and low pressure circuits, and controls one or more parameters, such as for example, a flow rate of the working fluid and bypass valves, to maintain the temperature and pressure at these various portions of the circuit to within the desired range of values. This results in substantial increase in the performance of both the engine and the heat recovery system.

Figure 1:
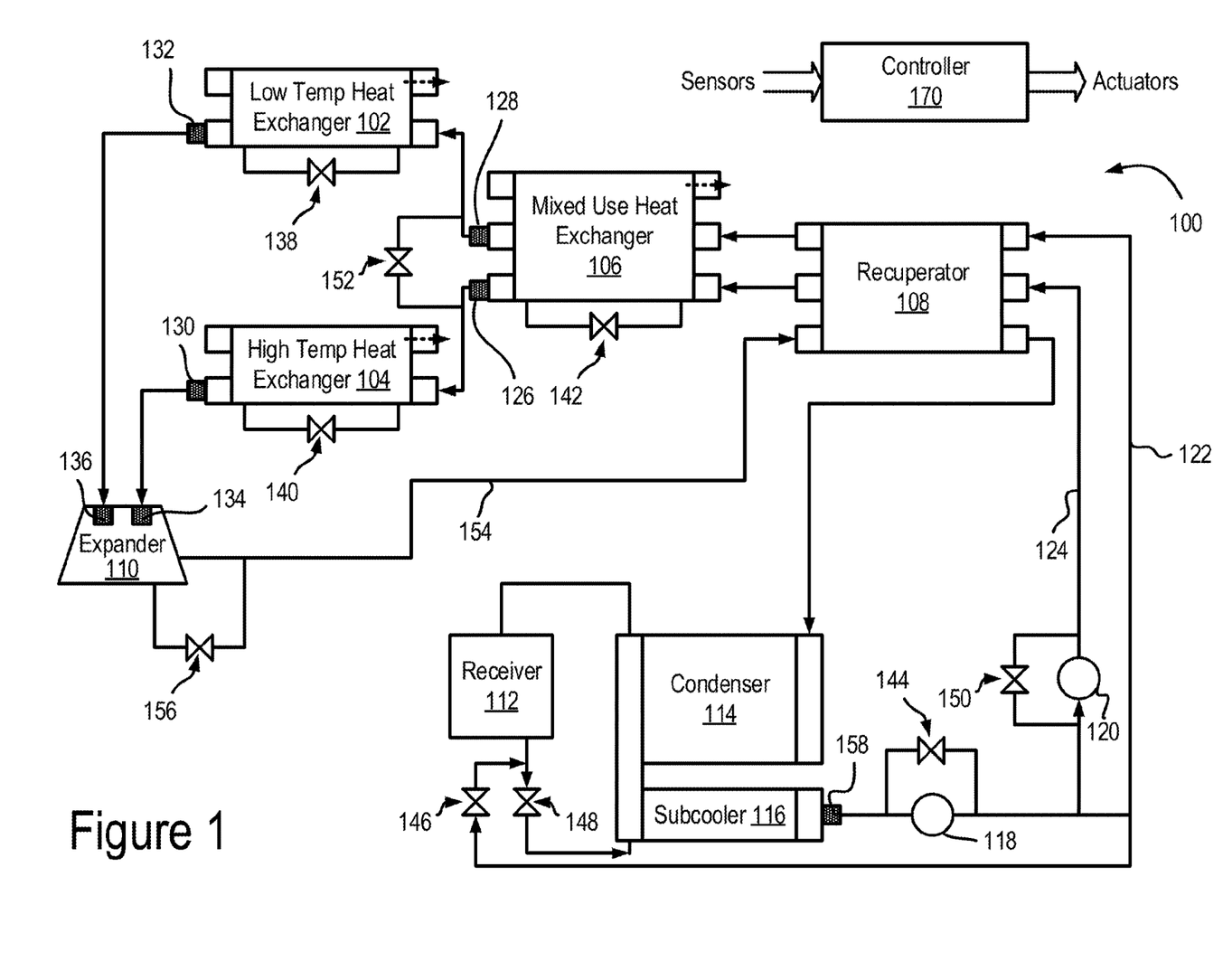
FIG. 1 shows a first example WHR system, according to an embodiment of the present disclosure.

FIG. 1 shows a first example WHR system 100. The first WHR system 100 includes a high pressure working fluid circuit 124 and a low pressure working fluid circuit 122. The high pressure circuit 124 circulates a working fluid that is maintained at a higher temperature and pressure than the working fluid in the low pressure circuit 122. In some scenarios, the high pressure circuit 124 can be connected to heat exchangers that exchange heat with high temperature heat sources, while the low pressure circuit can be connected to heat exchangers that exchange heat with relatively lower temperature heat sources. The low pressure circuit 122 includes a low pressure pump 118 and a recuperator 108 positioned downstream of the low pressure pump 118. It should be noted that the terms "upstream" and "downstream" refer to the flow direction of the working fluid in the WHR system 100. One or more heat exchangers are positioned downstream of the recuperator 108. For example, a mixed use heat exchanger (MUHE) 106 is positioned downstream of the recuperator 108 and a low temperature heat exchanger (LTHE) 102 is positioned downstream of the MUHE 106. The low pressure working fluid at the output of the LTHE 102 is provided to a low pressure input of the expander 110.

Similarly, the high pressure circuit 124 includes a high pressure pump 120 and the recuperator 108 positioned downstream of the low pressure pump 118. The recuperator 108 can include two working fluid channels, one for the high pressure circuit 124 and another for the low pressure circuit 122. The high pressure circuit 124 further includes the MUHE 106 positioned downstream of the recuperator 108. Like the recuperator 108, the MUHE 106 includes a high pressure channel for the high pressure working fluid in the high pressure circuit 124 and a low pressure channel for the low pressure working fluid in the low pressure circuit 122. The high pressure circuit 124 further includes a high temperature heat exchanger (HTHE) 104 positioned downstream of the MUHE 106 and receives high pressure working fluid from the high pressure channel of the MUHE 106. The high pressure working fluid at the output of the HTHE 104 is provided to a high pressure input of the expander 110.

The high pressure circuit 124 and the low pressure circuit 122 are combined into a common return circuit 154 at an output of the expander 110. The working fluid from the output of the expander 110 is provided to a return channel of the recuperator 108. The return circuit 154 further includes a condenser 114 and a subcooler positioned downstream of the return channel of the recuperator 108. The working fluid at the output of the subcooler 116 is provided back to the low pressure pump 118 and the high pressure pump 120 positioned downstream of the low pressure pump 118.

In some embodiments, the low pressure pump 118 and the high pressure pump 120 can be fixed flow pumps. In some embodiments, the pumps can be variable flow pumps. The recuperator 108 can be utilized to lower the temperature of the working fluid in the return circuit 154 and increase the temperature of the working fluids in the high pressure circuit 124 and the low pressure circuit 122. The recuperator 108 receives the working fluid in the return circuit 154 from the expander 110. This working fluid is typically at high temperature and in or close to a vapor state. The recuperator 108, by transferring the heat from the working fluid in the return circuit 154 to the working fluid in the low pressure circuit 122 and the high pressure circuit 124 reduces the burden on the condenser 114 for cooling the working fluid.

The MUHE 106 can be coupled to low or medium temperature heat sources. In some embodiments, the MUHE 106 can be coupled to heat sources that are at a temperature that is lower than the boiling temperature of the working fluids in the low pressure circuit 122 and the high pressure circuit 124. As an example, the MUHE 106 can be coupled to a charge air cooler circuit of a turbocharger. The charge air cooler circuit of a vehicle can receive charge air from a compressor of the turbocharger, cool the charge air, and provide the cooled charge air to an intake manifold of the engine. The MUHE 106 can contribute to cooling the charge air by transferring heat from the charge air to the working fluids in the low pressure circuit 122 and the high pressure circuit 124. In some examples, the MUHE 106 can be coupled to other heat sources, such as the exhaust gas for the EGR system, or any other fluid of the vehicle. In some embodiments, the MUHE 106 can be optional. That is, the output of the recuperator 108 could be directly provided to the LTHE 102 and the HTHE 104.

The LTHE 102 can be coupled to low temperature heat sources, similar to those discussed above in relation to the MUHE 106. The HTHE 104 can be coupled to high temperature heat sources. As an example, the high temperature heat sources can include those heat sources that have a temperature that is greater than the boiling temperature of the working fluid in the high pressure circuit 124. In some embodiments, the HTHE 104 can be coupled to heat sources such as the EGR exhaust gas from the EGR system, the exhaust gas directed to the tail pipe of the vehicle, an engine coolant from an engine cooling circuit, or some other high temperature heat source. The HTHE 104 and the LTHE 102 can provide enough heat to change the state of the working fluids in the respective low pressure and high pressure circuits 122 and 124 to the vapor state.

The expander 110 receives at least two working fluid inputs—one from the LTHE 102 and another from the HTHE 104. In one embodiment, the expander 110 can be a dual input expander, with each input fluidly coupled to a respective one of the high pressure circuit 124 and the low pressure circuit 122. In another embodiment, the expander 110 can include twin expanders, with each expander being fluidly coupled to a respective one of the high pressure circuit 124 and the low pressure circuit 122. As the substantially vaporized working fluids travel through the expander 110, the vapor expands and loses pressure, thereby driving a turbine of the expander 110 to generate useful work. In some embodiments, the turbine of the expander 110 is operatively coupled to a generator, which can convert the mechanical energy of the rotating turbine into electrical energy. In some embodiments, the turbine of the expander can be coupled to a crankshaft of the engine, an engine accessory shaft, and/or other components, such as, for example, via a gear or belt drive so as to transfer the mechanical energy from the turbine to those devices. According to various embodiments, the expander 110 can include a piston expander, a screw expander, a scroll expander, a gerotor expander, or other type of expander. In some embodiments, the expander 110 can have variable geometry input nozzles. The variable geometry nozzle can be adjusted to change the flow rate verses the pressure characteristics of the expander.

The condenser 114 is positioned along the return circuit 154 downstream of the recuperator 108. The condenser 114 is structured to receive a high temperature working fluid and transfer heat from the working fluid to the ambient environment, thereby substantially or fully condensing the working fluid back to a liquid state. In some embodiments, the condenser 114 can be at least partially air cooled, and can be positioned off-engine in a vehicle cooling package area structured to receive ram air.

The subcooler 116 is positioned in the return circuit 154 downstream of the condenser 114. The subcooler 116 is structured to ensure that the working fluid is in a subcooled liquid state before being provided to the low pressure and high pressure pumps 118 and 120. Ensuring that the working fluid is in the liquid state reduces the risk of cavitation in the pumps, thereby improving the performance and the reliability of the pumps.

The receiver 112 is coupled to the condenser 114 and the subcooler 116 and can serve as a reservoir for the working fluid. Flow in and out of the receiver 112 can be used to control the flow rate of the working fluid through the subcooler 116 and fluid inventory in the condenser 114. A first receiver valve 148 can be positioned downstream of the receiver 112 and upstream of the subcooler 116. The first receiver valve 148 can be open during normal operation to increase liquid subcooling entering the pump or closed to decrease it. A second receiver valve 146 is positioned between a point that is downstream of the receiver 112 and upstream of the first receiver valve 148, and a point that is downstream of the low pressure pump 118. The second receiver valve 146 can be closed during normal operation, but can be opened to decrease the amount of subcooling offered by the subcooler 116.

The WHR system 100 further includes a control system including a controller 170, several sensors, and several actuators. For example, the sensors can include temperature and pressure sensors, and the actuators can include valves. The sensors and the valves can be communicably coupled to the controller 170. In particular, the sensors can provide the controller 170 with values of the measured parameters, and the valves can receive actuating signals from the controller to actuate the valves. As shown in FIG. 1, the WHR system 100 includes subcooler sensors 158, MUHE sensors 126 and 128, LTHE sensors 132, HTHE sensors 130, and expander input sensors 134 and 136. In some embodiment, all of the components processing working fluid in the WHR circuit can include sensors at their respective inputs and outputs. The actuators can include a low pressure pump bypass valve 144 that is positioned across the low pressure pump 118, a high pressure pump bypass valve 150 that is positioned across the high pressure pump 120, the low pressure pump 118 and the high pressure pump 120 (in particular to control their flow rate). The actuators also include a MUHE bypass valve 142 positioned across the MUHE 106. The MUHE bypass valve 142 can include two valves, one valve each for the low pressure channel and the high pressure channel. The actuators further include the LTHE bypass valve 138 positioned across the LTHE 102, and the HTHE bypass valve 140 positioned across the HTHE 104. The actuators also include the expander bypass valve 156 positioned across the expander 110. The expander bypass valve 156 can comprise two valves—one for bypassing the high pressure input and another for bypassing the low pressure input to the expander 110. The actuators further include the first receiver valve 148 and the second receiver valve 146. The actuator also can include a transfer valve 152 that can transfer working fluid between the high pressure circuit 124 and the low pressure circuit 122. Details of the operation of the controller 170 are discussed further below.

Figure 2:
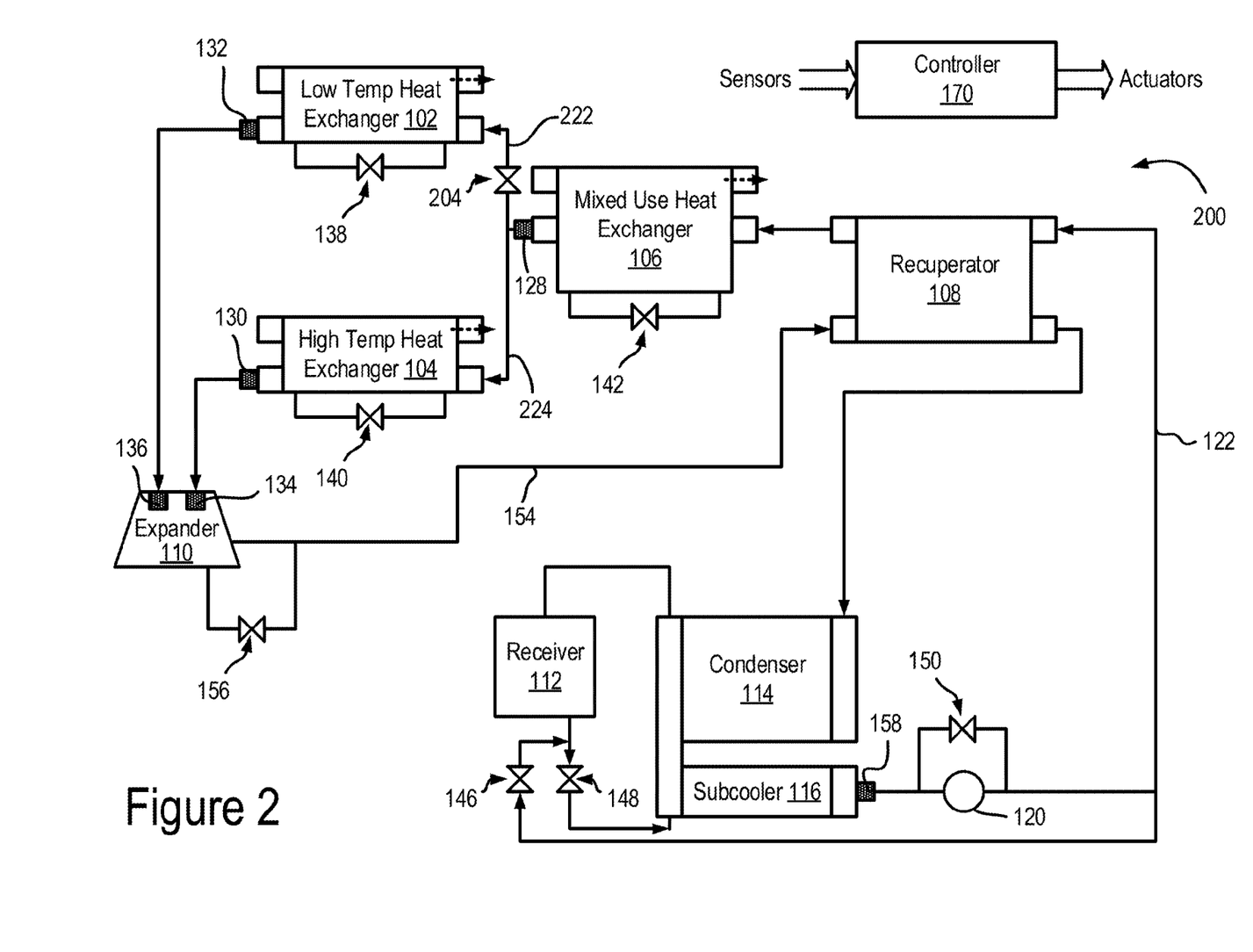
FIG. 2 shows a second example WHR system, according to an embodiment of the present disclosure.

FIG. 2 shows a second example WHR system 200. The second example WHR system 200 is similar to the first example WHR system 100 discussed in relation to FIG. 1 in that both the first and the second example WHR systems 100 and 200 include high pressure and low pressure working fluid circuits. In the second WHR system 200, however, only one pump is used. For example, only the high pressure pump 120 is used to pump the working fluid. This means that only one channel of both the recuperator 108 and the MUHE 106 is utilized for heat exchange. At the output of the MUHE 106, the working fluid is split into a high pressure circuit 224 and a low pressure circuit 222. The pressure in the low pressure circuit 222 is maintained by a flow regulation valve 204, which can be controlled by the controller 170. In some embodiments, the flow regulation valve 204 can be positioned downstream of the recuperator 108 when the MUHE 106 is not present in the system, or to maintain the dual channel MUHE 106 discussed above in relation to FIG. 1. The second example WHR system 200 can be more reliable compared to the first WHR system 100 due to the reduced number of components.

With the large number of heat sources providing heat to the working fluid, and temperature requirements of some of the heat sources (e.g., the charge air), the desirable temperature and pressure of the working fluid can be maintained despite dynamic changes in the input heat and temperature requirement of the heat sources. In particular, the controller 170 can be configured to maintain the working fluid at the desired temperature at various locations in the system. For example, the controller 170 can be configured to maintain the working fluid at a superheated state before it enters the expander 110, and to maintain the working fluid at a liquid or subcooled state when it exits the subcooler 116. The controller 170 can also control the temperature and pressure of the working fluid based on the temperature requirements of the heat sources, such as the charge air temperature requirement. The controller 170 can be configured to manage the fluid inventory within the system. The controller 170 can further be configured to maintain the operation of the WHR system. Each of these control scenarios is discussed in detail below.

Figure 3:
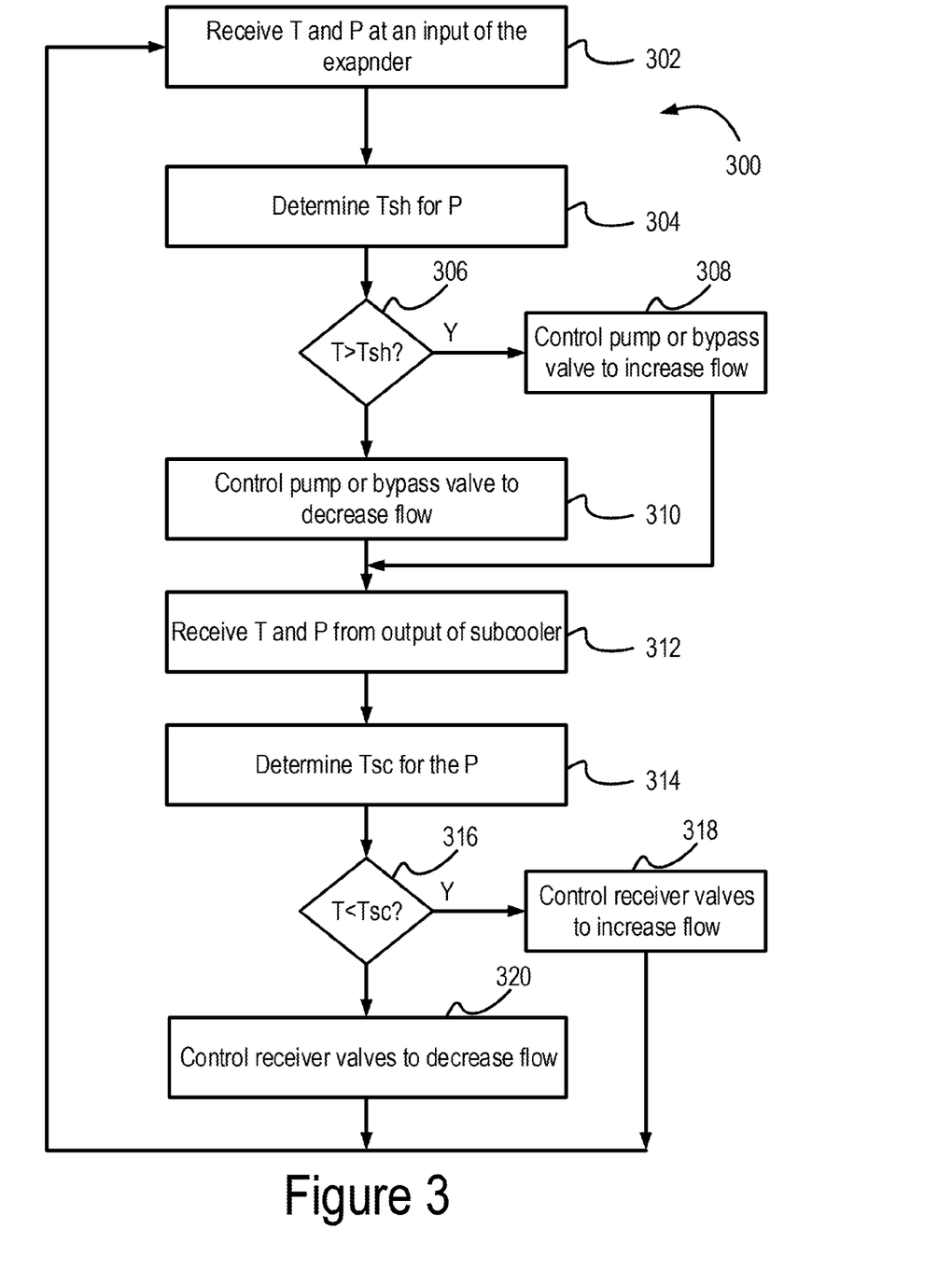
FIG. 3 shows a flow diagram of an example process for maintaining temperatures of the working fluid.

FIG. 3 shows a flow diagram of an example process 300 for maintaining temperatures of the working fluid. It is desirable to maintain the pressure and the temperature of the working fluid in both the low pressure circuit 122 and the high pressure circuit 124, in particular at the input of the expander 110, within ranges that correspond to the superheated state of the working fluid. Maintaining the working fluid in the superheated state at the input of the expander 110 can increase the efficiency of the WHR system, increase the power output of the expander 110, and also reduce the risk of condensation within the expander—thereby reducing the risk of damage to the expander 110 due to liquid droplets. In addition, maintaining the temperature of the working fluid at subcooled temperatures at the output of the subcooler 116 can increase the amount of cooling provided to the engine components, thereby increasing engine performance. The process 300 includes receiving temperature T and pressure P input at an input of the expander 110 (302). Referring to FIG. 1, the temperature T and the pressure P can be measured by the expander input sensors 134 and 136 at the inputs of the expander 110. Focusing on the high pressure circuit 124, the controller can receive the temperature T and pressure P values from the expander sensor 134 (although the controller 170 can execute the process 300 to similarly maintain the temperature in the low pressure circuit 122 as well). The controller 170 can receive actual values of the T and P from the expander sensor 134, or receive values that are representative of the values of the T and P. In such instances, the controller 170 can calculate the actual values of the temperature T and pressure P based on the representative values based on a look up table or a formula.

The process 300 further includes determining a desired superheated temperature Tsh based on the pressure P at the input of the expander 110 (304). The superheated temperature Tsh of the working fluid can vary based on the pressure the working fluid is operating under. In some embodiments, the controller 170 can use a look up table that is representative of the characteristic saturation curve of the working fluid. The look up table can provide the value of Tsh based on the measured value of P. In some embodiments, the controller 170 can use a formula to determine the superheated temperature Tsh. In some embodiments, the Tsh can be a range of values instead of a single temperature value. Under some operating conditions, it can be advantageous to maintain the working fluid above the normal Tsh target, as maintaining the temperature above the normal Tsh target can increase the efficiency of the WHR system 100 and increase the power generated by the expander 110. Under some other operating conditions, it may be beneficial to reduce the temperature of the working fluid at the input of the expander to increase the capacity of heat extraction that can be provided to the various heat exchangers. This, in turn, can increase the efficiency and power output of the engine.

The process 300 includes determining whether the measured temperature T at the input of the expander 110 is greater than the target superheated temperature Tsh (306). As mentioned above, in some embodiments, Tsh target can represent a range of values. The controller 170 can determine whether the measured temperature T is greater than the range of values represented by Tsh target. The process 300 includes, in response to the measured temperature T being greater than the superheated temperature Tsh target, controlling the high pressure pump 120 and/or the high pressure pump bypass valve 150 to increase the flow rate of the high pressure pump 120 (308). For example, if the high pressure pump 120 is a variable flow rate pump, the controller 170 can control the pump itself to increase the flow rate, and therefore, the pressure of the high pressure circuit 124. In embodiments, where the high pressure pump 120 is a fixed flow rate pump, the controller 170 can close the high pressure pump bypass valve 150 to feed a smaller portion of the fluid downstream of the high pressure pump 120 back upstream of the high pressure pump 120, thereby increasing the effective flow rate, and therefore the pressure, of the high pressure circuit 124. By increasing the pressure, the temperature T of the inlet of the expander 110 can be reduced to the desired Tsh target value or range of values.

The process 300 further includes, in response to the temperature T at the input of the expander 110 not being greater than the superheated temperature Tsh target, controlling the pump or the bypass valve to decrease the flow (310). In instances where the temperature T is undesirably below the superheated temperature Tsh, the controller 170 can decrease the effective flow of the high pressure circuit 124. For example, the controller 170 can directly control the high pressure pump 120 if the pump is a variable flow pump, and/or can open, if closed, the high pressure pump bypass valve 150 to decrease the flow rate and the pressure in the high pressure circuit 124. Thus, the controller 170 can control the pumps or the bypass valves across the pumps to control the flow rate, and therefore, the pressure. The controller 170 can therefore match the pressure of the working fluid to the temperature of the heat exchangers (indicated by the temperature of the working fluid at the input of the expander) to maintain the working fluid in the target superheated state.

The process 300 includes maintaining the temperature of the working fluid at the output of the subcooler 116. The process 300 includes receiving temperature T and pressure P values from the output of the subcooler (312). In particular, the controller 170 can receive the temperature T and pressure P values from the subcooler sensors 158 positioned at the output of the subcooler 116. Subcooling temperatures can refer to the temperature of the working fluid below its saturation temperature. Each working fluid, based on its saturation curve, can have a corresponding saturation temperature corresponding to a current pressure of the working fluid. Subcooling refers to reducing the temperature of the working fluid below the saturation temperature. The degree of subcooling can refer to the amount by which the temperature of the working fluid is below the saturation temperature. Increasing the amount or degree of subcooling can result in lower working fluid temperature, which can be utilized to further cool the fluids of the engine or the vehicle in the heat exchangers, thereby increasing the efficiency or the power output of the engine. On the other hand, lower subcooling allows for reduced condenser pressure and an increase in the expander 110 power. In some embodiments, the ideal subcooling temperature Tsc can be determined by the operator based on the tradeoff between increased engine power and increased expander power.

The process 300 includes determining the Tsc based on the P measured at the output of the subcooler 116 (314). As mentioned above, the degree of subcooling can be based on the saturation temperature of the working fluid. The saturation temperature of the working fluid may vary based on the operating pressure of the working fluid. The controller 170 can determine, based on a look up table or a mathematical formula representative of the characteristic curve of the working fluid, the saturation temperature, and therefore the Tsc based on the desired degree of subcooling. As an example, the controller 170 can determine Tsc=Tsat−x, where Tsat is the saturation temperature of the working fluid and 'x' is amount of desired subcooling in degrees.

The process 300 includes determining whether the temperature T at the output of the subcooler is greater than the desired subcooling temperature Tsc (316). In some embodiments, the Tsc can represent a range of values, and the controller 170 can determine whether the measured value of T is less than the range of values of Tsc. The process 300 includes, in response to a determination that the sensed temperature is less than the desired sub cooling temperature Tsc, increasing a flow of working fluid from the receiver 112 to the subcooler 116 (318), which increases subcooling. In particular, the controller 170 can open the first receiver valve 148 and close the second receiver valve 146, allowing flow of working fluid from the receiver 112 to the subcooler. This increase flow of working fluid from the receiver 112 to the subcooler 116 increases the amount of subcooling at the output of the subcooler 116.

The process 300 includes controlling the receiver valves to decrease the flow of working fluid from the receiver 112 to the subcooler 116 (320). In particular, the controller 170 can close the first receiver valve 148 and open the second receiver valve 146 to reduce the effective flow of the working fluid from the receiver 112 to the subcooler 116, thereby reducing the amount of subcooling. The process can repeatedly monitor both the superheating and the subcooling of the working fluid at various locations in the working fluid circuit.

Figure 4:
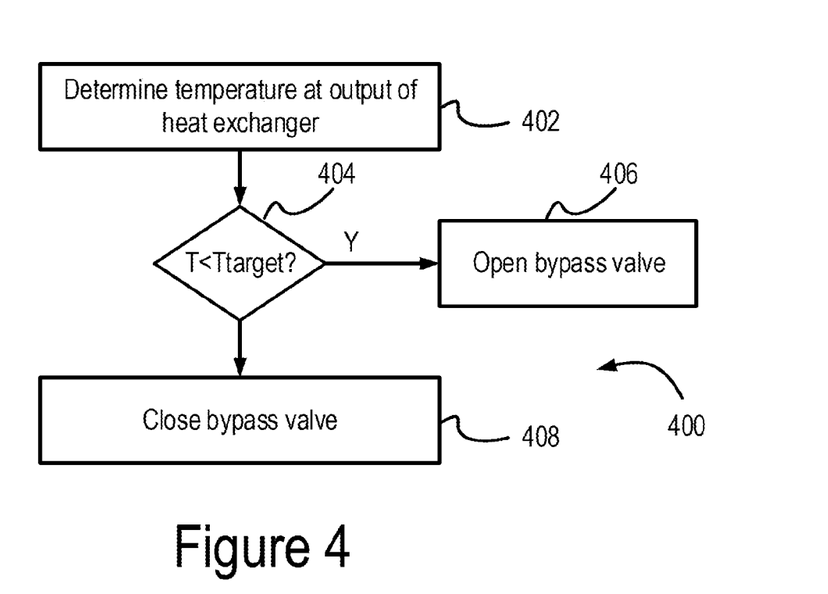
FIG. 4 shows a flow diagram of an example process for controlling a temperature of a fluid cooled by a heat exchanger.

FIG. 4 shows a flow diagram of an example process 400 for controlling a temperature of a fluid cooled by a heat exchanger. In particular, the controller 170 can execute the process to control the temperature of engine fluids cooled by the one or more heat exchangers in the high pressure circuit 124 and the low pressure circuit 122. As an example, the controller 170 can execute the process 400 to control the temperature of the charge air cooled by the MUHE 106 shown in FIG. 1. However, it should be noted that the controller 170 can execute similar processes in association with the other heat exchangers in the WHR system 100, such as, for example, the LTHE 102 and the HTHE 104. The process 400 includes determining a temperature at an output of the heat exchanger (402). In some embodiments, sensors 128 (or 126) at the working fluid output of the MUHE 106 can be used to indicate the temperature of the fluid cooled by the working fluid. In some embodiments, the WHR system 100 can include temperature and/or pressure sensors at the heat source output of the MUHE 106. The process 400 further includes determining whether the temperature of the heat source is below a target temperature (404). In some embodiments, the charge air, which is provide to the input manifold of the engine, may have to be provided within certain temperature ranges to be effective. The operator can select the value or a range of values for target temperature Ttarget.

The process 400 includes opening a bypass valve if the temperature of the heat source is less than the target temperature (406). Having the temperature of the heat source below the target temperature Ttarget or a target temperature range, can indicate that the heat source is being over cooled. To reduce the amount of cooling provided to the heat source fluid, the controller 170 can activate the MUHE bypass valve 142 to bypass at least a portion of the working fluid from the input of the MUHE 106 to the output of the MUHE 106. By bypassing some of the working fluid, the amount of cooling of the heat source fluid will be reduced, thereby potentially raising the temperature of the heat source fluid. The process 400 also includes closing a bypass valve if the temperature of the heat source is greater than the target temperature Ttarget or a range of target temperatures (408). Having the temperature greater than the target temperature can indicate that the heat source fluid is not getting enough cooling. Thus, the controller 170 can close, if open, the MUHE bypass valve 142. In some embodiments, the MUHE bypass valve 142 can be a variable flow valve. In some such embodiments, the controller 170 can control the valve to regulate the amount of working fluid that is bypassed to attain the desired target temperature. The controller 170 can similarly bypass the working fluid in relation to both the low pressure channel and the high pressure channel of the heat exchangers. In some embodiments, the WHR system 100 can include at least one bypass valve for each channel through the heat exchanger. In some embodiments, the controller 170 can control the bypass valve associated with the high temperature channel first to control the temperature of the heat source fluid. As the high temperature channel carries high pressure working fluid, it offers a relatively higher level of heat exchange compared to the working fluid in the low pressure channel. In some embodiments, for an even faster response, the controller 170 can activate the bypass valve of both the high pressure and low pressure channels.

Figure 5:
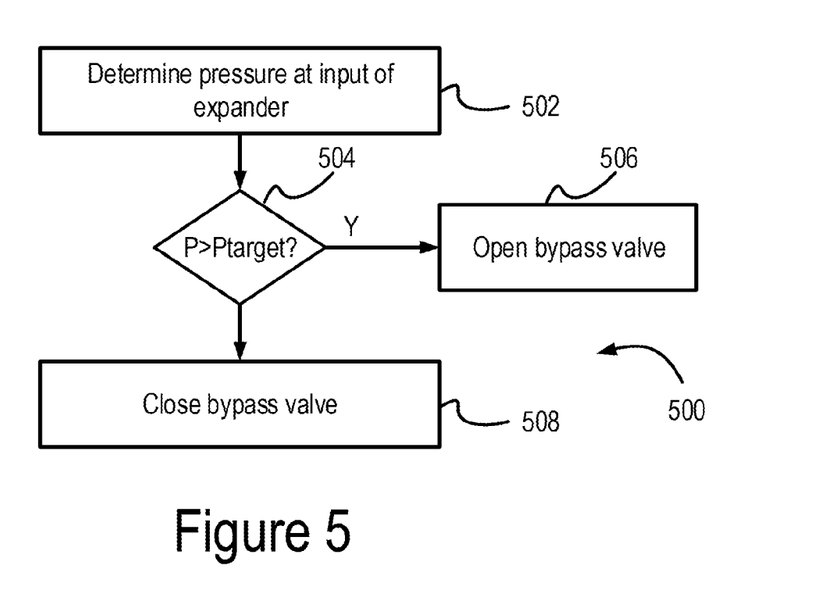
FIG. 5 shows a flow diagram of an example process for controlling working fluid pressure at inputs of the expander.

FIG. 5 shows a flow diagram of an example process 500 for controlling working fluid pressure at inputs of the expander. In some embodiment, the pressure at the expander 110 inputs may increase beyond a target pressure range or value. The target pressure range or value can be representative of a design pressure value of the WHR system 100, which is preferably not to be exceeded. The controller can control the expander bypass valve 156 to control the input pressure. The process 500 includes determining a pressure P at an input of the expander 110 (502). The controller 170 can receive the pressure measured by the sensors 136 and 134 positioned at the inputs of the expander 110. The process further includes determining whether the measured value of the pressure is greater than the target pressure value Ptarget (504). If the pressure is greater than the target pressure value, the controller 170 can activate the expander bypass valve 156 to bypass a portion of the working fluid at the input of the expander 110 to the output of the expander 110. The controller 170 can monitor the pressure at both the high pressure and the low pressure inputs of the expander 110 and independently open the bypass valves associated with the high and low pressure inputs (506). The process 500 includes closing the bypass valve if the pressure at the input of the expander 110 is not greater than the target pressure (508). This can indicate that the pressure has stabilized and the controller 170 can therefore close the expander bypass valve 156.

Figure 6:
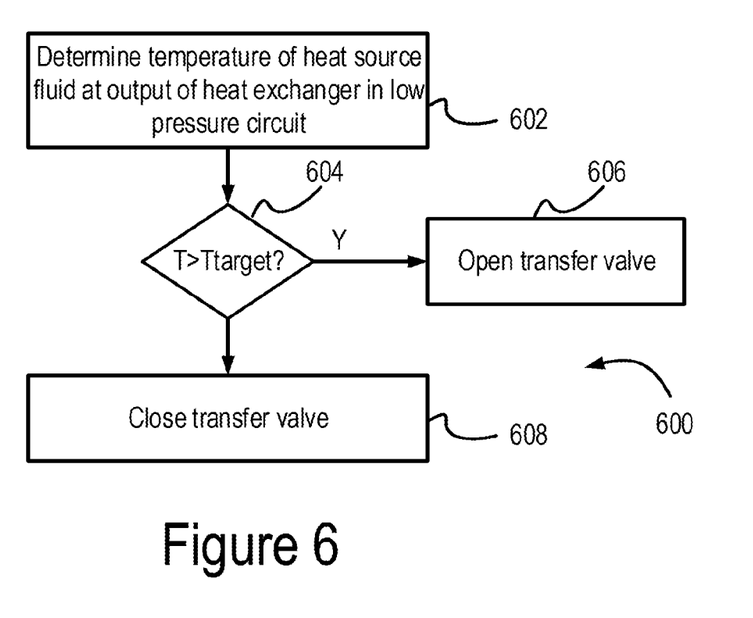
FIG. 6 shows a flow diagram of a process for controlling transfer of working fluid from a high pressure circuit to a low pressure circuit, according to an embodiment of the present disclosure.

FIG. 6 shows a flow diagram of a process 600 for controlling transfer of working fluid from a high pressure circuit to a low pressure circuit. In some embodiments, the low pressure circuit 122 may become over-utilized and may not be able to sustain the desired cooling of the engine fluids. In particular, assume that the temperatures of the heat source fluids at the outputs of the MUHE 106 or the LTHE 102 is greater than the desired temperatures. This may occur when the working fluid in the low pressure circuit 122 does not have the capacity to absorb the heat provided by the heat source fluids. In some such instances, the controller 170 can transfer a portion of the working fluid in the high pressure circuit 124 into the low pressure circuit 122. The process includes determining a temperature of a heat source fluid at an output of a heat exchanger in the low pressure circuit (602). The controller 170 can receive temperature T values from one or more heat exchangers, namely the MUHE 106 and the LTHE 102 in the low pressure circuit 122. Temperature sensors at the output of channels of the heat exchangers receiving the heat source fluids can provide the controller 170 with the temperature values. The process 600 include determining that the temperature T is above a target temperature Ttarget value or a range of values (604). The temperature being above the target values can indicate that the working fluid is incapable of absorbing sufficient heat from the heat source fluid. The process 600 includes opening a transfer valve if the temperature is greater than the target temperature (606). The controller 170 can open the transfer valve 152 that is positioned between the low pressure circuit 122 and the high pressure circuit 124 at the output of the MUHE 106 to transfer working fluid from the high pressure circuit 124 to the low pressure circuit 122. It should be noted that the transfer valve can be positioned anywhere in the WHR system 100 between the low pressure circuit 122 and the high pressure circuit 124. By transferring the working fluid from the high pressure circuit 124 to the low pressure circuit 122 the capacity of the low pressure circuit 122 can be increased. The process 600 further includes closing the transfer valve if the temperature is below the target value or range of values (608). The temperature being below the target temperature can indicate that the working fluid in the low pressure circuit is capable of absorbing sufficient heat from the heat source fluids to maintain the temperature below the target temperature. The controller can control the transfer valve 152 to cease the transfer of the working fluid from the high pressure circuit 124 to the low pressure circuit.

In some embodiments, the expander 110 can provide variable flow into the expander 110 for the same entry pressure. In some embodiments, the expander 110 can include variable geometry nozzles or have a variable speed or variable displacement, to allow for variable flow. In some embodiments, the controller 170 can control the expander 110 to allow increased flow through the expander 110 without increasing the pressure and the saturation temperature of the working fluid. This can allow the expander to generate high power without affecting the pressure and temperature of the working fluid. Furthermore, this can allow the adjustment of the flow v. pressure curve of the working fluid in the high pressure circuit 124 independently of that of the working fluid in the low pressure circuit 122. This can provide increased cooling of the heat source fluids while increasing the power generated by the expander 110.

Figure 7:
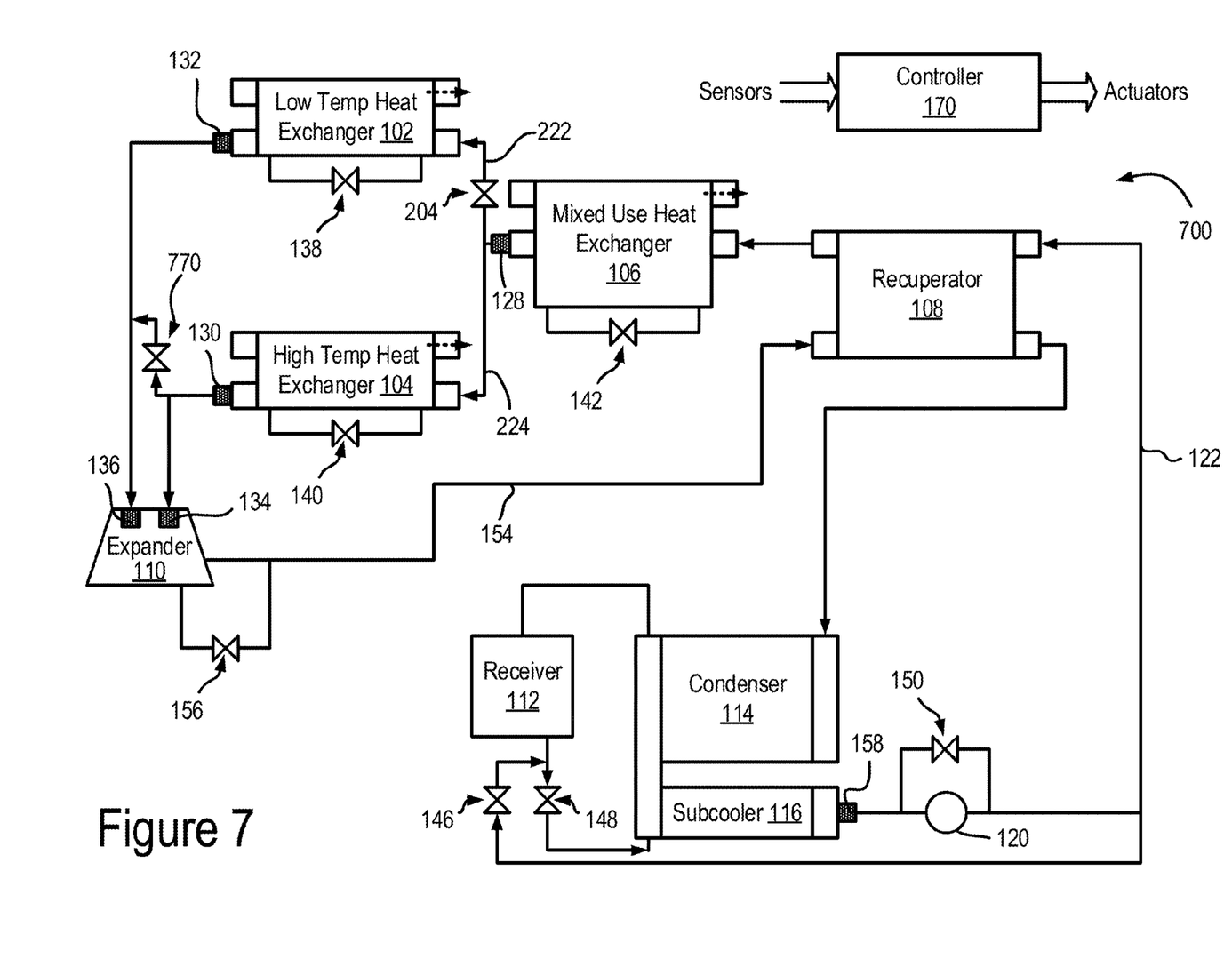
FIG. 7 shows a third example WHR system, according to an embodiment of the present disclosure.

FIG. 7 shows a third example WHR system 700. The third example WHR system 700 is similar to the second example WHR system 200 discussed in relation to FIG. 2. However, the third example WHR system 700 additionally includes a first flow adjustment valve 770 positioned between the high pressure circuit 224 and the low pressure circuit 222. In particular, an input of the first flow adjustment valve 770 receives working fluid from a position in the high pressure circuit 224 that is downstream of the HTHE 104 and upstream of the expander 110. The output of the first flow adjustment valve 770 selectively provides working fluid at a position in the low pressure circuit 222 that is downstream of the LTHE 102 and upstream of the expander 110. In some instances, the controller 107 can open the first flow adjustment valve 770 to provide excess heat energy in the high pressure circuit 224 to the low pressure circuit 222. The excess heat energy in the working fluid may be imparted by a high temperature source, such as, for example, a tail pipe exhaust of a vehicle. The expander 110 can have a flow capacity over which the expander 110 may not be able to convert the heat energy in the working fluid into useful work. Specifically, if the flow rate of the working fluid entering the expander 110 is greater than a threshold value that corresponds to a flow capacity of the expander 110, the additional heat energy in the working fluid may not be converted by the expander 110 into useful work. The excess heat instead may result in the temperature of the working fluid in the return circuit 154 to be high, thereby increasing the burden on the condenser 114 to cool the working fluid. In such instances, where there is excess heat energy in the working fluid in one circuit, the excess heat energy can be transferred to the other circuit.

In some embodiments, the excess heat energy in the working fluid in the high pressure circuit 124 can be transferred to the working fluid in the low pressure circuit 122. In particular, excess heat and flow of the working fluid in the high pressure circuit 224 can be transferred to the low pressure circuit 222 if the low pressure circuit portion of the expander 110 has unused flow capacity. As shown in FIG. 7, the first flow adjustment valve 770 is positioned between the high pressure circuit 224 and the low pressure circuit 222 upstream of the expander 110. The excess heat energy that would otherwise be wasted in the high pressure circuit 224, can now be utilized in the low pressure circuit 222 because of the available capacity in the low pressure circuit portion of the expander 110. The controller 170 can receive temperature of the working fluid at the high pressure circuit 224 from the expander input sensors 134, and can receive a flow rate in the low pressure circuit 222 from the expander input sensor 136. If the temperature of the working fluid in the high pressure circuit 224 at the input of the expander 110 is greater than a threshold value, and the flow rate of the working fluid in the low pressure circuit 222 at the input of the expander 110 is below a threshold value, the controller 170 can open the first flow adjustment valve 770 to transfer a portion of the high temperature working fluid from the high pressure circuit 224 to the low pressure circuit 222 upstream of the expander 110. The controller 170 can monitor the temperature received from the expander input sensor 134 in the high pressure circuit 224, and the flow rate of the working fluid in the low pressure circuit at the input of the expander 110. If the temperature decreases below a threshold value that indicates no excess heat energy and/or the flow rate in the low pressure circuit 222 is equal to or greater than a flow capacity of the expander 110 in the low pressure circuit 222, the controller 170 can close the first flow adjustment valve 770.

Figure 8:
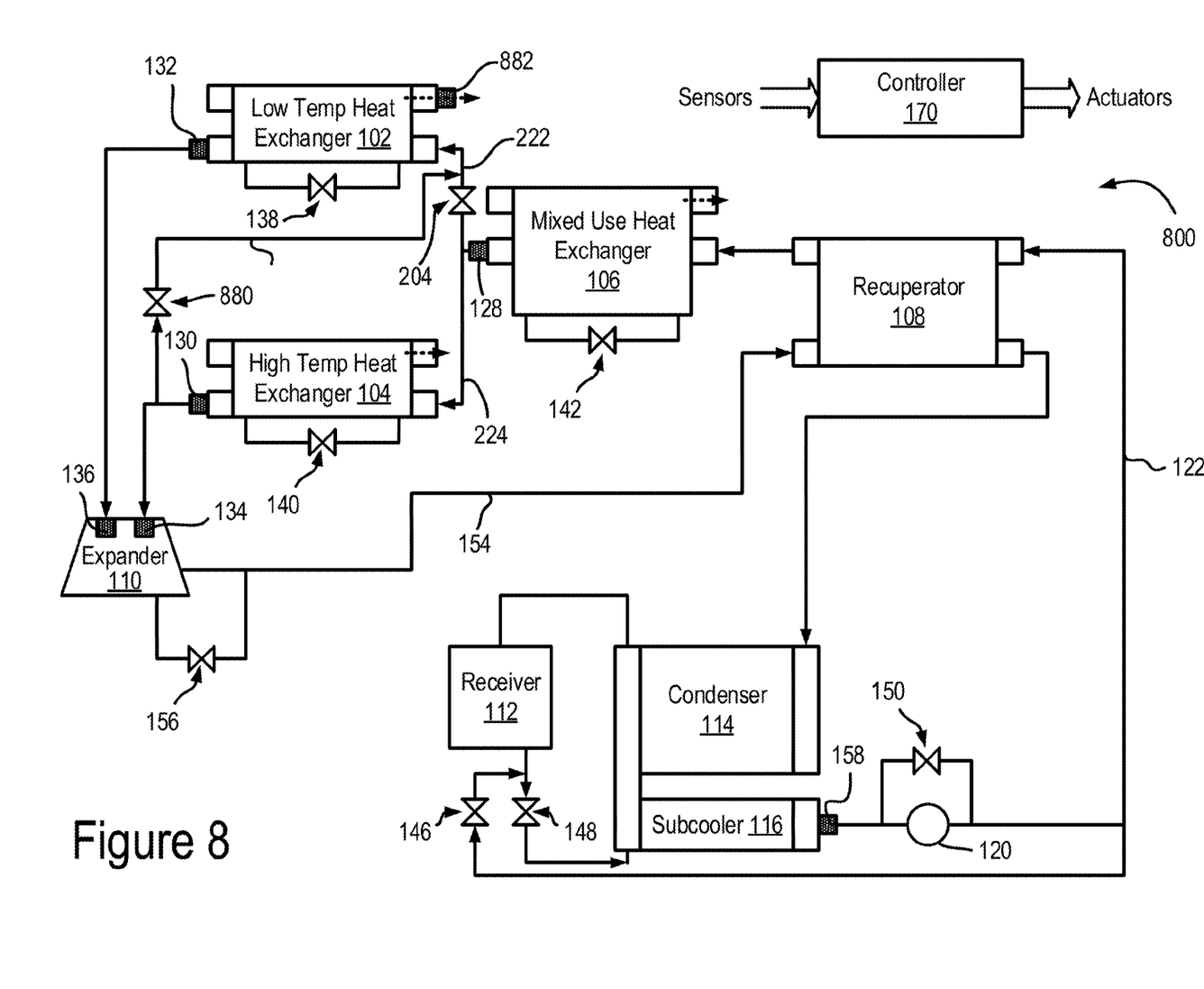
FIG. 8 shows a fourth example WHR system, according to an embodiment of the present disclosure.

FIG. 8 shows a fourth example WHR system 800. The fourth example WHR system 800 is similar to the second example WHR system 200 discussed in relation to FIG. 2. However, the fourth example WHR system 800 additionally includes a second flow adjustment valve 880 positioned between the high pressure circuit 224 and the low pressure circuit 222. In particular, the input of the second flow adjustment valve 880 receives working fluid from a position in the high pressure circuit 224 that is downstream of the HTHE 104 and upstream of the high pressure circuit input of the expander 110. The output of the second flow adjustment valve 880 selectively provides working fluid to a position in the low pressure circuit that is upstream of the LTHE 102. The fourth example WHR system 800 can be used to provide heat back to heat sources coupled with the LTHE 102.

As mentioned above, the LTHE 102 can be coupled with low or medium temperature heat sources, such as, for example, an engine coolant. The low temperature heat sources can have temperature that is lower than the boiling temperature of the working fluid. In some instances, such as where the coolant is the heat source, a low temperature of the coolant, such as during engine startup, can result in a cold start of the engine, which, in turn, can increase the proportion of harmful emissions in the exhaust gases. Therefore it is advantageous to have the coolant over a certain threshold value to enable the engine to more quickly warm up and therefore quickly reduce the proportion of harmful emissions in the exhaust gas. The controller 170 can control the second flow adjustment valve such that high temperature working fluid from the high pressure circuit 224 is directed into the LTHE 102 causing the heat from the working fluid to be transferred to the coolant) flowing through the LTHE 102. As a result, the temperature of the coolant can rise, thereby warming up the engine more quickly than if the coolant were to be allowed to heat up under normal engine operations.

The controller 170 can receive temperature of the coolant from a temperature sensor 882 positioned at the outlet of the heat source channel of the LTHE 102. If the temperature of the coolant is below a threshold value, the controller 170 can open the second flow adjustment valve 880 to allow a portion of the working fluid output by the HTHE 104 to flow into the input of the LTHE 102. The controller 170 can monitor the coolant temperature reading received from the temperature sensor 882, and if the temperature of the coolant is equal to or above a second threshold value (can be equal to the first threshold value), the controller 170 can close the second flow adjustment valve 880. The second threshold value can be indicative of a desired coolant temperature. In this manner, by transferring heat energy from the WHR working fluid to one or more heat sources, the operation of the overall system can be improved. While FIG. 8 show the transfer of working fluid into the LTHE 102, the working fluid may also or alternatively be provided to the MUHE 106.

The first and second flow adjustment valves 770 and 880 can be variable flow valves, i.e., the controller 170 can adjust the magnitude of flow rate of the working fluid through the valves. In such instances, the controller 170 can gradually increase the magnitude of flow through the valves, thereby gradually increasing the amount of working fluid flowing from the high pressure circuit 224 to the low pressure circuit 222.

In some embodiments, the WHR systems discussed herein may not include a recuperator. In some embodiments, the WHR system discussed herein may include more than two circuits. That is, the WHR system may include circuits in addition to the low pressure circuit 122 and the high pressure circuit 124. In some embodiments, the heat exchangers can be arranged in parallel instead of in series as shown in FIGS. 1 and 2. In some embodiments, the low pressure pump 118 and the high pressure pump 120 may be arranged in parallel instead of in series as shown in FIG. 1. The working fluid can include a number of different fluids such as, for example, R1233zd(E), R245fa, other refrigerants, ethanol, toluene, water, and other fluids or blends of working fluids.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A waste heat recovery (WHR) system, comprising:
   at least two pressure circuits, each pressure circuit including at least one heat exchanger, each of the at least two pressure circuits providing a working fluid to the respective at least one heat exchanger and to an expander having a plurality of inputs, comprising separate input ports, corresponding to a number of the at least two pressure circuits; and
   a controller communicably coupled with the at least two pressure circuits, the controller configured to:
      receive a first pressure value and a first temperature value from a first sensor positioned at one of an inputs of the expander, determine a superheated temperature value from the first pressure value based on at least one characteristic of the working fluid, determine whether the first temperature value is greater than the superheated temperature value, and control, responsive to determining that the first temperature value is greater than the superheated temperature value, at least one of a pump pumping the working fluid or a bypass valve positioned across the pump to increase a flow of the working fluid.

2. The WHR system of claim 1, wherein the controller is further configured to receive a second temperature value and a second pressure value from a second sensor positioned at an output of a subcooler receiving working fluids from the at least two pressure circuits, determine a subcooled temperature value based on the second pressure value and at least one characteristic of the working fluid, determine whether the second temperature value is less than the subcooled temperature value, and control, responsive to determining that the second temperature value is less than the subcooled temperature value, at least one valve increasing flow of the working fluid to or from a working fluid reservoir to the subcooler.

3. The WHR system of claim 1, wherein the controller is further configured to:

receive a third temperature value from a third sensor positioned at an output of at least one heat exchanger, determine whether the third temperature value is less than a target temperature value, and control, responsive to determining that the third temperature value is less than the target temperature value, a bypass valve across the at least one heat exchanger to allow at least a portion of the working fluid to flow from upstream of the at least one heat exchanger to downstream of the at least one heat exchanger.

4. The WHR system of claim 1, wherein the controller is further configured to:

receive a third pressure value from a fourth sensor positioned on at least one input of the plurality of inputs of the expander, determine whether the third pressure value is greater than a target pressure value, and control, responsive to determining that the third pressure value is greater than the target pressure value, a bypass valve across the expander to allow at least a portion of the working fluid from upstream of the at least one input of the plurality of inputs of the expander to downstream of an output of the expander.

5. The WHR system of claim 1, further comprising:

a transfer valve positioned between a first pressure circuit and a second pressure circuit of the at least two pressure circuits, the first pressure circuit having a working fluid pressure that is less than a working fluid pressure of the second pressure circuit, wherein the controller is further configured to:

receive a fourth temperature value from a fourth temperature sensor positioned at an output of a heat exchanger in the first pressure circuit, determine that the fourth temperature value is above a first circuit temperature target value, and control the transfer valve to transfer working fluid from the second pressure circuit to the first pressure circuit.

6. The WHR system of claim 1, further comprising:

a common pump providing working fluid to both a first pressure circuit and a second pressure circuit of the at least two pressure circuits, the first pressure circuit having a working fluid pressure that is less than a working fluid pressure of the second pressure circuit; and a transfer valve configured to divert a portion of the working fluid from the second pressure circuit to the first pressure circuit;

wherein the controller is further configured to:

receive a fourth temperature value from a fourth temperature sensor positioned at an output of a heat exchanger in the first pressure circuit, determine that the fourth temperature value is above a first circuit temperature target value, and control the transfer valve to increase transfer of working fluid from the second pressure circuit to the first pressure circuit.

7. The WHR system of claim 1, wherein the at least two pressure circuits comprises a first pressure circuit and a second pressure circuit, the first pressure circuit having a working fluid pressure that is less than a working fluid pressure of the second pressure circuit, and wherein the controller is further configured to:

receive a fifth temperature value from a fifth temperature sensor positioned at an output of a heat exchanger in the second pressure circuit, receive a flow rate from a flow rate sensor positioned at an input of the expander receiving the working fluid from the first pressure circuit, determine that the fifth temperature value is greater than a second pressure circuit target value and that the flow rate is less than a first pressure circuit target flow rate, and control a first flow adjustment valve to transfer working fluid from downstream of the output of the heat exchanger in the second pressure circuit to the input of the expander receiving working fluid from the first pressure circuit.

8. The WHR system of claim 1, wherein the at least two pressure circuits comprises a first pressure circuit and a second pressure circuit, the first pressure circuit having a working fluid pressure that is less than a working fluid pressure of the second pressure circuit;

wherein the controller is further configured to:

receive a sixth temperature value from a sixth temperature sensor positioned along a heat source channel of a heat exchanger in the first pressure circuit, determine that the sixth temperature value is less than a target heat source fluid value, and control a second flow adjustment valve to transfer working fluid from downstream of a heat exchanger in the second pressure circuit to an input of the heat exchanger in the first pressure circuit.

9. A method for operating a waste heat recovery (WHR) system including at least two pressure circuits, each pressure circuit including at least one heat exchanger, each of the at least two pressure circuits providing a working fluid to the respective at least one heat exchanger and to an expander having a plurality of inputs, comprising separate input ports, corresponding to a number of the at least two pressure circuits, the method comprising:

receiving, at a controller, a first pressure value and a first temperature value from a first sensor positioned at one of an inputs of the expander;

determining, at the controller, a superheated temperature value from the first pressure value based on at least one characteristic of the working fluid;

determining, at the controller, whether the first temperature value is greater than the superheated temperature value; and controlling, by the controller responsive to determining that the first temperature value is greater than the superheated temperature value, at least one of a pump pumping the working fluid or a bypass valve positioned across the pump to increase a flow of the working fluid.

10. The method of claim 9, further comprising:

receiving, at the controller, a second temperature value and a second pressure value from a second sensor positioned at an output of a subcooler receiving working fluids from the at least two circuits;

determining, at the controller, a subcooled temperature value based on the second pressure value and at least one characteristic of the working fluid;

determining, at the controller, whether the second temperature value is less than the subcooled temperature value;

controlling, by the controller, responsive to determining that the second temperature value is less than the subcooled temperature value, at least one valve increasing flow of the working fluid to or from a working fluid reservoir to the subcooler.

11. The method of claim 9, further comprising:

receiving, at the controller, a third temperature value from a third sensor positioned at an output of at least one heat exchanger;

determining, at the controller, whether the third temperature value is less than a target temperature value;

controlling, by the controller responsive to determining that the third temperature value is less than the target temperature value, a bypass valve across the at least one heat exchanger to allow at least a portion of the working fluid to flow from upstream of the at least one heat exchanger to downstream of the at least one heat exchanger.

12. The method of claim 9, further comprising:

receiving, at the controller, a third pressure value from a fourth sensor positioned on at least one input of the plurality of inputs of the expander;

determining, at the controller, whether the third pressure value is greater than a target pressure value;

controlling, by the controller responsive to determining that the third pressure value is greater than the target pressure value, a bypass value across the expander to allow at least a portion of the working fluid from upstream of the at least one input of the plurality of inputs of the expander to downstream of an output of the expander.

13. The method of claim 9, wherein the WHR system includes a transfer valve positioned between a first pressure circuit and a second pressure circuit of the at least two pressure circuits, the first pressure circuit having a working fluid pressure that is less than a working fluid pressure of the second pressure circuit, the method comprising:

receiving, at the controller, a fourth temperature value from a fourth temperature sensor positioned at an output of a heat exchanger in the first pressure circuit;

determining, at the controller, that the fourth temperature value is above a first circuit temperature target value, controlling, by the controller, the transfer valve to transfer working fluid from the second pressure circuit to the first pressure circuit.

14. The method of claim 9, wherein the WHR system includes a common pump providing working fluid to both a first pressure circuit and a second pressure circuit of the at least two pressure circuits, the first pressure circuit having a working fluid pressure that is less than a working fluid pressure of the second pressure circuit, and a transfer valve diverting a portion of the working fluid from the second pressure circuit to the first pressure circuit, the method comprising:

receiving, at the controller, a fourth temperature value from a fourth temperature sensor positioned at an output of a heat exchanger in the first pressure circuit;

determining, at the controller, that the fourth temperature value is above a first circuit temperature target value, controlling, by the controller, the transfer valve to increase transfer of working fluid from the second pressure circuit to the first pressure circuit.

15. The method of claim 9, wherein the at least two pressure circuits comprises a first pressure circuit and a second pressure circuit of the at least two pressure circuits, the first pressure circuit having a working fluid pressure that is less than a working fluid pressure of the second pressure circuit, the method further comprising:

receiving, by the controller, a fifth temperature value from a fifth temperature sensor positioned at an output of a heat exchanger in the second pressure circuit;

receiving, by the controller, a flow rate from a flow rate sensor positioned at an input of the expander receiving the working fluid from the first pressure circuit;

determining, by the controller, that the fifth temperature value is greater than a second pressure circuit target value and that the flow rate is less than a first pressure circuit target flow rate; and controlling, by the controller, a first flow adjustment valve to transfer working fluid from downstream of the output of the heat exchanger in the second pressure circuit to the input of the expander receiving working fluid from the first pressure circuit.

16. The method of claim 9, the at least two pressure circuits comprises a first pressure circuit and a second pressure circuit, the first pressure circuit having a working fluid pressure that is less than a working fluid pressure of the second pressure circuit, the method further comprising:

receiving, by the controller, a sixth temperature value from a sixth temperature sensor positioned along a heat source channel of a heat exchanger in the first pressure circuit;

determining, by the controller, that the sixth temperature value is less than a target heat source fluid value; and controlling, by the controller, a second flow adjustment valve to transfer working fluid from downstream of a heat exchanger in the second pressure circuit to an input of the heat exchanger in the first pressure circuit.

17. A system, comprising:

an engine; and a waste heat recovery (WHR) system, comprising:

at least two pressure circuits, each pressure circuit including at least one heat exchanger receiving at least one fluid associated with the engine, the at least two pressure circuits providing a working fluid to the respective at least one heat exchanger and to an expander having a plurality of inputs, comprising separate input ports, corresponding to a number of the at least two pressure circuits, and a controller communicably coupled with the at least two pressure circuits, the controller configured to:
- receive a first pressure value and a first temperature value from a first sensor positioned at one of an inputs of the expander;
- determine a superheated temperature value from the first pressure value based on at least one characteristic of the working fluid;
- determine whether the first temperature value is greater than the superheated temperature value; and
- control, responsive to determining that the first temperature value is greater than the superheated temperature value, at least one of a pump pumping the working fluid or a bypass valve positioned across the pump to increase a flow of the working fluid.

18. The system of claim 17, wherein the controller is further configured to:
- receive a second temperature value and a second pressure value from a second sensor positioned at an output of a subcooler receiving working fluids from the at least two pressure circuits;
- determine a subcooled temperature value based on the second pressure value and at least one characteristic of the working fluid;
- determine whether the second temperature value is less than the subcooled temperature value; and
- control, responsive to determining that the second temperature value is less than the subcooled temperature value, at least one valve increasing flow of the working fluid to or from a working fluid reservoir to the subcooler.

19. The system of claim 17, wherein the controller is further configured to:
- receive a third temperature value from a third sensor positioned at an output of at least one heat exchanger;
- determine whether the third temperature value is less than a target temperature value; and
- control, responsive to determining that the third temperature value is less than the target temperature value, a bypass valve across the at least one heat exchanger to allow at least a portion of the working fluid to flow from upstream of the at least one heat exchanger to downstream of the at least one heat exchanger.

20. The system of claim 17, wherein the controller is further configured to:
- receive a third pressure value from a fourth sensor positioned on at least one input of the plurality of inputs of the expander,
- determine whether the third pressure value is greater than a target pressure value, and
- control, responsive to determining that the third pressure value is greater than the target pressure value, a bypass valve across the expander to allow at least a portion of the working fluid from upstream of the at least one input of the plurality of inputs of the expander to downstream of an output of the expander.

* * * * *